United States Patent
Han et al.

(10) Patent No.: US 9,143,883 B2
(45) Date of Patent: Sep. 22, 2015

(54) METHOD AND SYSTEM FOR IMPROVING PERFORMANCE IN DISCOVERY STAGE OF FAST ROAMING

(71) Applicants: Jianpo Han, Beijing (CN); Guangzhi Ran, Beijing (CN)

(72) Inventors: Jianpo Han, Beijing (CN); Guangzhi Ran, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1 day.

(21) Appl. No.: 13/665,684

(22) Filed: Oct. 31, 2012

(65) Prior Publication Data

US 2014/0119279 A1 May 1, 2014

(51) Int. Cl.
*H04W 4/00* (2009.01)
*H04W 4/02* (2009.01)
*H04W 76/00* (2009.01)
*H04M 3/00* (2006.01)

(52) U.S. Cl.
CPC *H04W 4/00* (2013.01); *H04M 3/00* (2013.01); *H04W 76/00* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,520,586 B1* | 8/2013 | Husted et al. | 370/318 |
| 2005/0243737 A1* | 11/2005 | Dooley et al. | 370/254 |
| 2005/0249129 A1* | 11/2005 | Goodall et al. | 370/252 |
| 2006/0187873 A1* | 8/2006 | Friday et al. | 370/328 |
| 2008/0075035 A1* | 3/2008 | Eichenberger | 370/328 |
| 2009/0028091 A1* | 1/2009 | Dimou | 370/328 |
| 2010/0093280 A1* | 4/2010 | Ahn et al. | 455/41.2 |
| 2010/0157835 A1* | 6/2010 | Zhang et al. | 370/252 |
| 2012/0307685 A1* | 12/2012 | Kim et al. | 370/255 |
| 2013/0121178 A1* | 5/2013 | Mainaud et al. | 370/252 |

* cited by examiner

Primary Examiner — Hong Cho

(57) ABSTRACT

The present disclosure discloses a method and digital device for improving performance in discovery stage of fast roaming. A disclosed digital device switches from a first wireless communication channel to a second wireless communication channel; transmits, on the second wireless communication channel, a request message comprising a designated field; and switches from the second wireless communication channel to the first wireless communication channel prior to receiving a response message corresponding to the request message on the second wireless communication channel. A network device receives the request message from a client device on the second wireless communication channel. The request message is associated with a first signal strength level. The network device determines that the request message includes a designated field; and transmits a response message to the client device via a different communication interface, such as a wired or wireless distribution system, or the client device's data transmission channel.

30 Claims, 10 Drawing Sheets

| SA  | DA  | 88BF | PROBE RESPONSE |
|-----|-----|------|----------------|
| 520 | 540 | 560  | 580            |

FIG. 5

| AP<br>620 | AP LOCATION<br>640 |
|---|---|
| AP1<br>622 | (40°7'00, 116°35'00)<br>642 |
| AP2<br>624 | (40°7'30, 116°35'20)<br>644 |
| AP3<br>626 | (40°7'30, 116°35'50)<br>646 |
| ... ... | ... ... |

FIG. 6A

| CLIENT<br>660 | CLIENT LOCATION<br>680 |
|---|---|
| CLIENT1<br>662 | (40°7'20, 116°36'30)<br>682 |
| ... ... | ... ... |

FIG. 6B

METHOD AND SYSTEM FOR IMPROVING PERFORMANCE IN DISCOVERY STAGE OF FAST ROAMING

FIELD

The present disclosure relates to wireless fast roaming in wireless networks. In particular, the present disclosure relates to improving performance in discovery stage of fast roaming in wireless networks.

BACKGROUND

Wireless digital networks, such as networks operating under the current Electrical and Electronics Engineers (IEEE) 802.11 standards, are spreading in their popularity and availability. With such popularity, however, problems related to fast roaming tend to occur during high speed movement of a client device in a wireless network.

When a client device moves at a low speed in the wireless network, the client device can iteratively scan through a plurality of wireless channels and determine which network device to associate with. Specifically, the client device can send a request message, such as a probe request, and receive a response message, such as a probe response, from a network device in the neighborhood. Because the speed of client movement is rather slow, the change in location among multiple iterations typically does not cause the signal strength level (e.g., received signal strength indication, RSSI) to vary drastically, and thereby will not likely affect the accuracy of the scanning procedure.

Nevertheless, when a client device moves at a high speed in the wireless network, the change in location among multiple iterations of scanning can be so large that it causes the signal strength level (e.g., RSSI) to vary drastically, and thereby affects the accuracy of scanning. Hence, in order to ensure the accuracy of scanning when a client device moves at a high speed, the client device needs to reduce the scanning intervals. As a result, the client device will spend less time on data transmissions and more time on network device discovery when moving at a fast speed. Thus, network traffic could suffer apparent degradation and/or fluctuation.

Conventionally, a network device can maintain a list of adjacent network devices and the wireless channels that they communication on, and send the list to a client device when the client device needs to roam at a high speed. Thus, the client device uses the adjacent network device list it received from the network device that it currently is associated with to reduce the number of channels the client device needs to scan. However, because the adjacent network device list may not be up-to-date or complete, the conventional solution to channel scanning during fast roaming may not produce accurate results.

Moreover, the solution does not benefit much in a high density deployment of wireless network devices.

BRIEF DESCRIPTION OF THE DRAWINGS

The present disclosure may be best understood by referring to the following description and accompanying drawings that are used to illustrate embodiments of the present disclosure.

FIG. 5 illustrates an exemplary network frame used in discovery stage of fast roaming in a wireless network according to embodiments of the present disclosure.

FIGS. 6A-6B illustrate exemplary device location tracking used in discovery stage of fast roaming according to embodiments of the present disclosure.

DETAILED DESCRIPTION

In the following description, several specific details are presented to provide a thorough understanding. While the context of the disclosure is directed to channel scanning in discovery stage of fast roaming in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to wireless fast roaming in wireless networks. In particular, the present disclosure relates to improving performance in discovery stage of fast roaming in wireless networks.

According to embodiments of the present disclosure, a digital device can reduce or eliminate the waiting periods on wireless channels during the scanning procedure. As a result, the digital device can increase the data transmission periods on the current channel that the digital device uses for communication with a network device (e.g., an access point, AP).

With the solution provided herein, a disclosed digital device switches from a first wireless communication channel to a second wireless communication channel; transmits, on the second wireless communication channel, a request message comprising a designated field; and switches from the second wireless communication channel to the first wireless communication channel prior to receiving a response message corresponding to the request message on the second wireless communication channel.

Furthermore, a disclosed network device receives the request message from a client device on the second wireless communication channel. The request message is associated with a first signal strength level. The network device determines that the request message includes a designated field; and transmits a response message to the client device via a different communication interface, such as a wired or wireless interface to a distribution system or the client device's data transmission channel.

Additionally, in some embodiments, the client device can selectively reduce the number of wireless communication channels to be scanned during the discovery stage of fast roaming based at least on the location tracking information associated with the neighboring network devices and the client device.

Computing Environment

Figure 1:
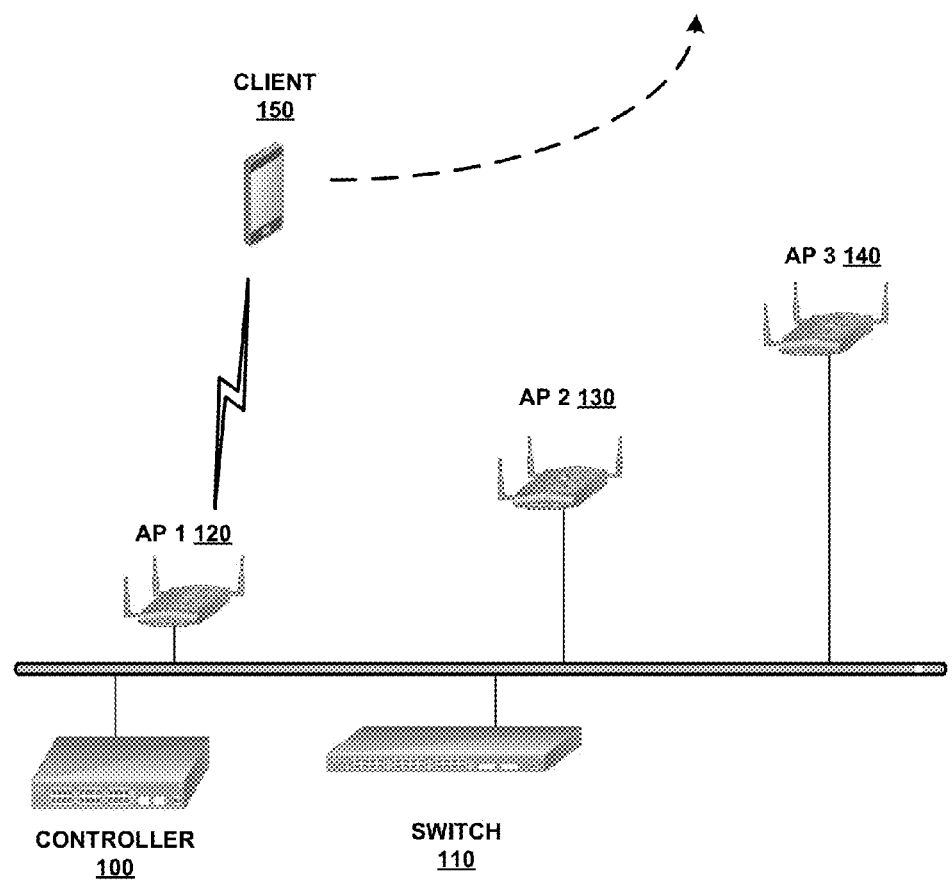
FIG. 1 is a diagram illustrating an exemplary wireless network environment according to embodiments of the present disclosure.

FIG. 1 shows an exemplary wireless digital network environment according to embodiments of the present disclosure. FIG. 1 includes a controller 100 and/or a switch 110 that connect to a plurality of network devices, such as access points AP1 120, AP2 130, and AP3 140 in a wireless network. Moreover, a network device may be connected to one or more client devices via wireless or wired connections. For example, as illustrated in FIG. 1, AP1 120 is connected to client device 150 via wireless connections.

Note that, some client devices may be moving from one location to a different location in the wireless network. The speed of movement can be high for some client devices under some occasions, and can be low under other occasions or for other client devices. As client device 150 moves, client device 150 may change its association from one network device to another. For example, initially, client device may be associated with access point AP1 120. As client device 150 moves along the illustrated path, client device 150 may become disassociated with AP1 120, and start to associate with AP2 130. When client device 150 moves farther away from AP2 130, client device 150 may disassociate with AP2 130 and start to associate with AP3 140, etc.

The network depicted in FIG. 1 may operate on a private network including one or more local area networks. The local area networks may be adapted to allow wireless access, thereby operating as a wireless local area network (WLAN). In some embodiments, each network corresponds to a unique basic service set (BSS) identifier. In some embodiments, one or more networks may share the same extended service set (ESS).

In addition, network depicted in FIG. 1 may include multiple network control plane devices, such as network controller 100. Network control plane device can optionally provide functions, such as creating and enforcing network policies, providing adaptive radio management, intrusion prevention, quality of service, and/or mobility, etc.

Before client device 150 starts to associate with a network device, client device 150 typically must go through a channel scanning process to discovery network devices located within its current neighborhood. The channel scanning mechanism for discovery stage is described in the next section.

Channel Scanning Mechanism

Figure 2A:
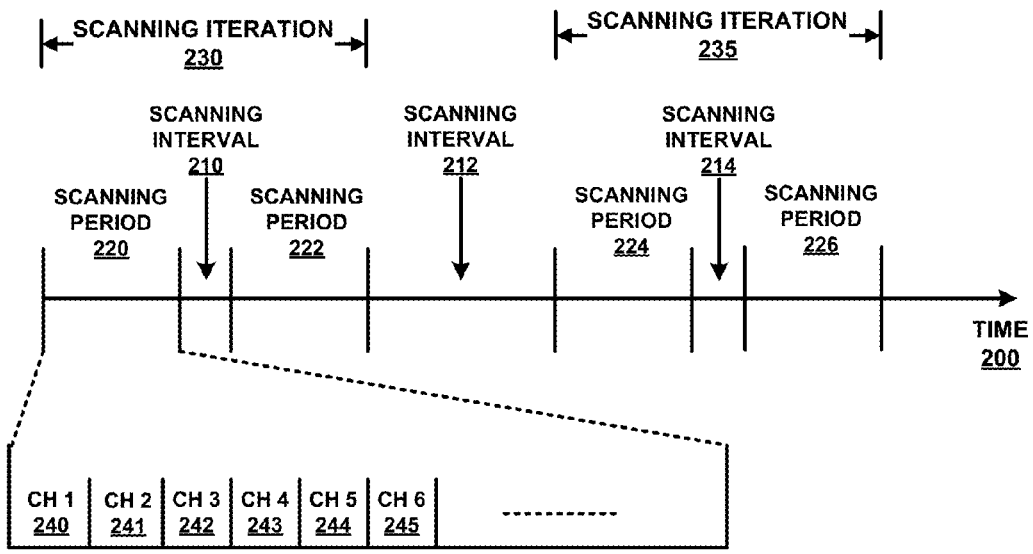
FIG. 2A is a diagram illustrating an exemplary scanning mechanism in discovery stage of fast roaming in a wireless network according to embodiments of the present disclosure.

FIG. 2A illustrates an exemplary scanning mechanism in discovery stage of fast roaming in a wireless network. The axis in FIG. 2A indicates time 200. As shown in FIG. 2A, the scanning mechanism of a client device performs multiple iterations of scanning activities, including scanning iteration 230, scanning iteration 235, etc. After completing each scanning iteration, the client device waits for a period of intervals before starting another scanning iteration. For example, after completing scanning iteration 230, the client device waits for a period of time as configured by scanning interval 212 before starting scanning iteration 235. During the scanning intervals, the client device may continue data transmission with the network device it currently associates with.

In addition, each scanning iteration may include multiple scanning periods separated by scanning intervals. For example, scanning iteration 230 includes scanning period 220 and scanning period 222, as well as scanning interval 210 between scanning periods 220 and 222. Also, scanning iteration 235 includes scanning period 224 and scanning period 226, as well as scanning interval 214 between scanning periods 224 and 226. During the scanning intervals 210 and 214, the client device may continue data transmission with the network device it currently associates with and on the wireless communication channel that the network device uses.

During each scanning period, such as scanning periods 220, 222, 224, and 226, the client device switches from a first channel (e.g., CH1 240) to a second channel (e.g., CH2 241), to a third channel (e.g., CH3 242), to a fourth channel (e.g., CH4 243), to a fifth channel (e.g., CH5 244), to a sixth channel (e.g., CH6 245), etc. In some embodiments, after the client device switches to a channel, the client device sends one or more request messages, such as a probe request, on the channel. Then, the client device listens for one or more response messages, such as a probe response, on the channel for a predetermined period of time. After the predetermined period of time expires, the client device switches to the next channel, and repeat the process. During each scanning period, the client device will scan through each channel at least once. If the client device does not receive any response message on a particular channel in a previous scanning period (e.g., scanning period 220), the client device may receive a response message on the particular channel in another scanning period (e.g., scanning period 222, scanning period 224, etc.), whereas the response message was sent in response to a request message from the client device in the previous scanning period (e.g., scanning period 220).

If when a response message is received by the client device, an extended period of time has elapsed since the request message was sent, the response message may not be up-to-date, especially in the scenarios where the client device has moved to a different location that is far away from its original location during the extended period of time. Note that, the scanning intervals within each scanning iteration (e.g., scanning interval 210 and scanning interval 214) are typically much shorter than the scanning intervals between two scanning iterations (e.g., scanning interval 212). Thus, if a request message is sent during a scanning iteration, and the response message is received during the next scanning iteration and the client device has been moving at a fast speed during the two scanning iterations, it is more likely that the response message is already out-of-date when received by the client device.

In some embodiments, the lengths of scanning intervals (e.g., scanning intervals 210, 212, and 214) can be configured by a network administrator. Therefore, one way to mitigate the problem is to reduce the scanning intervals between the scanning iterations based on the client device's speed of movement. For example, scanning interval 212 may be set to 30 milliseconds when the client device moves at a speed of 60 kilometer/hour, and 20 milliseconds when the client device moves at a speed of 100 kilometer/hour.

Figure 2B:
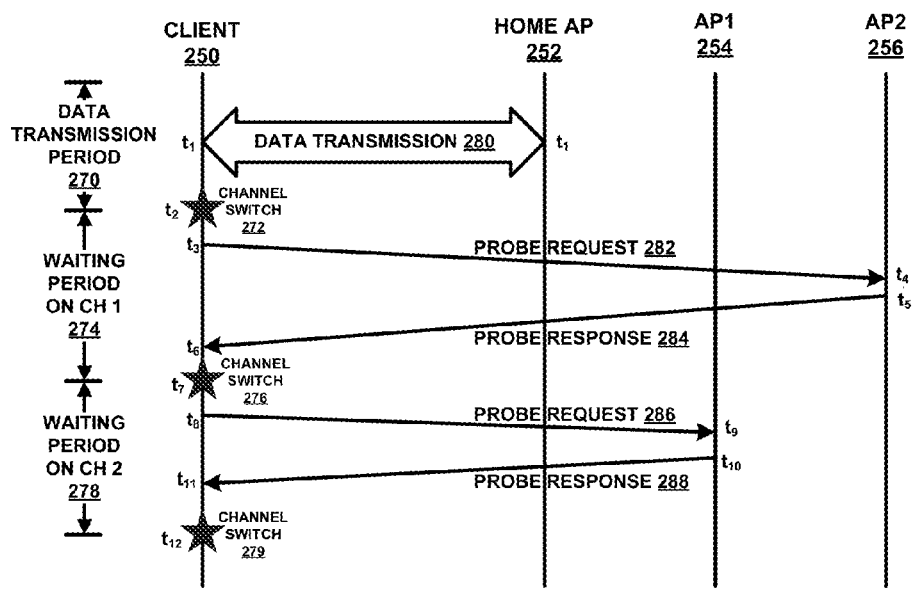
FIG. 2B is a sequence diagram illustrating an exemplary scanning mechanism in discovery stage of fast roaming in a wireless network according to embodiments of the present disclosure.

FIG. 2B is a sequence diagram illustrating exemplary scanning mechanism in discovery stage of fast roaming in a wireless network according to embodiments of the present disclosure. Specifically, FIG. 2B includes client device 250, home access point (AP) 252 that client device 250 is associated with, and other APs in the neighborhood such as AP1 254 and AP2 256.

In the example illustrated in FIG. 2B, at time point $t_1$, client device 250 is in data transmission period 270, during which data transmission 280 is performed between client device 250 and home AP 252. As client devices 250 changes its physical location, it may need to discover another AP in the neighborhood that provides stronger coverage and/or better service than home AP 252. Thus, at time point $t_2$, client device 250 starts the channel scanning process, and performs channel switch 272 to switch to a first wireless communication channel (e.g. channel 1). Next, at time point $t_3$, client device 250 sends a request message (e.g., probe request 282) on the first wireless communication channel. In the illustrated example, it is assumed that AP1 254 communicates on channel 2 and AP2 256 communicates on channel 1. Thus, AP1 254 will not receive the request message sent on channel 1, but AP2 256 receives the request message (e.g., probe request 282) at time point $t_4$. For illustration purpose only, assuming that AP2 256 sends a response message (e.g., probe response 284) at time point $t_5$ in response to the request message, and the response message is received by client device 250 at time point $t_6$. At time point $t_7$, client device 250 switches to a second wireless communication channel, e.g., channel 2. The time period between channel switch 272 at time point $t_2$ and channel switch 276 at time point $t_7$ indicates client device 250's waiting period 274 on channel 1.

Likewise, after client device 250 switches to the second wireless communication channel, client device 250 sends another request message (e.g., probe request 286) on the second wireless communication channel (e.g., channel 2) at time point $t_8$. Because AP1 254 communicates on channel 2, AP1 254 will receive the request message (e.g., probe request 286) at time point $t_9$. Subsequently, AP1 254 sends a response message (e.g., probe response 288) at time point $t_{10}$. The response message is received by client device 250 at time point $t_{11}$. Later, client device 250 switches to a third wireless communication channel at time point $t_{12}$. The time period between channel switch 276 at time point $t_7$ and channel switch 279 at time point $t_{12}$ indicates client device 250's waiting period 276 on channel 2. In some embodiments, the waiting period on each channel (e.g., waiting period 274 and waiting period 276) varies from 20 milliseconds to 40 milliseconds on each channel.

Alternative Communication Exchanges During Discovery Stage

Figure 3:
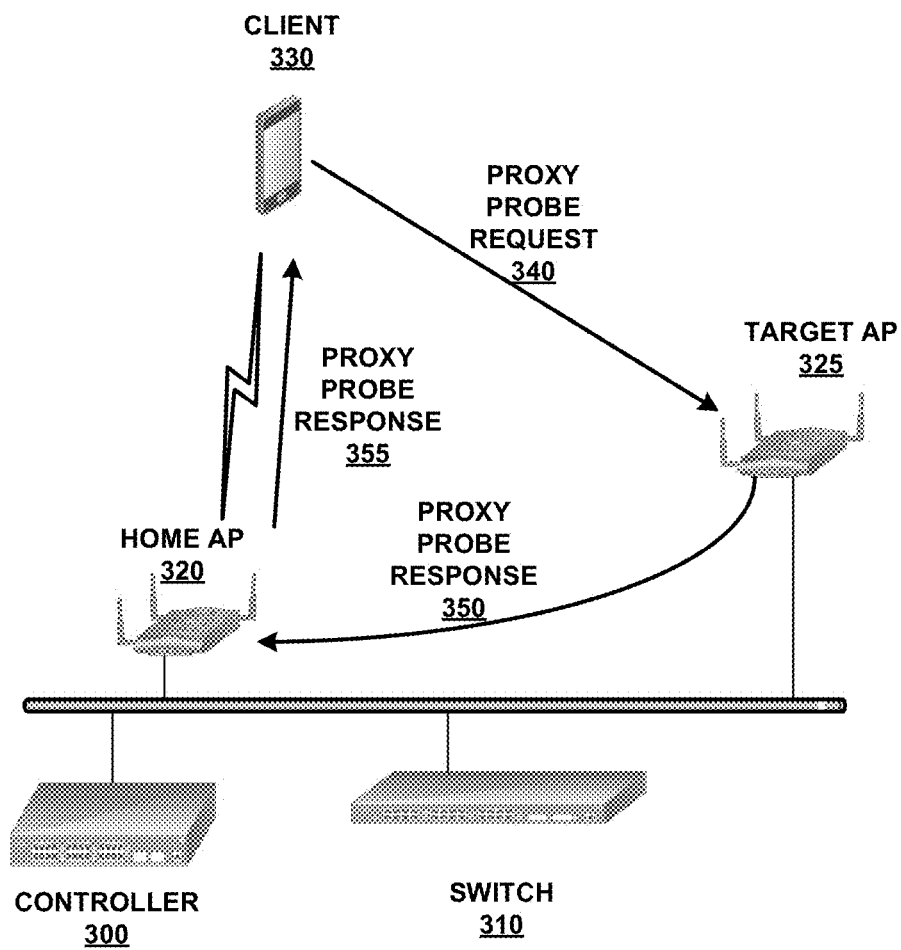
FIG. 3 illustrates an exemplary wireless communications in discovery stage of fast roaming in a wireless network according to embodiments of the present disclosure.

FIG. 3 illustrates an alternative exemplary wireless network environment according to embodiments of the present disclosure. FIG. 3 includes a controller 300 and/or a switch 310 that connect to a plurality of network devices, such as access points home AP 320 and target AP 325 in a wireless network. Moreover, home AP 320 is currently connected to client device 330 via wireless connections. Furthermore, target AP 325 is in the neighborhood of client device 330, and is a potential AP that client device 330 may become associated with to achieve better coverage and/or service.

In some embodiments, when client device 330 is in discovery stage of roaming, client device 330 switches to a first wireless communication channel, and sends a request message (e.g., a proxy probe request 340) on the first wireless communication channel. If target AP 325 also communicates on the first wireless communication channel, target AP 325 will receive the request message, and sends a response message (e.g., proxy probe response 350) through a wired interface, e.g., over a distribution system and/or on client device 330's working channel. Subsequently, home AP 320 forwards the response message (e.g., proxy probe response 355) to client 330. As a result, it is not necessary for client device 330 to wait on the first wireless communication channel for the response message. Thus, client device 330 can switch back to the wireless communication channel it uses to communicate with home AP 330, and resume data transmissions with the home AP 320. In some embodiments, the waiting period on each channel can be set to merely 1 to 2 milliseconds, and thus dramatically reducing the interruption of data transmissions between client device 330 and home AP 320 during discovery stage of fast roaming.

In some embodiments, after client 330 roams to another AP (e.g., AP2, not shown) other than target AP 325, AP2 will send a notification message (e.g., IAPP-ADD-notify in accordance with IEEE 802.11f standard) and a layer 2 update frame. After home AP 320 is notified that client 330 has roamed to another AP (e.g., AP2), home AP 320 will drop the response message received from target AP 325 (e.g., proxy probe response 350). Note that, after layer 2 frame update frame is transmitted, lay 2 transfer table will be updated. Hence, subsequent proxy probe response frames directed to client 330 will be sent to the other AP (e.g., AP2). Alternatively, in some embodiments, home AP 320 may decide to drop proxy probe response frames after a pre-determined number of failed retransmissions, and thus avoiding excessive load on home AP 320.

Figure 4:
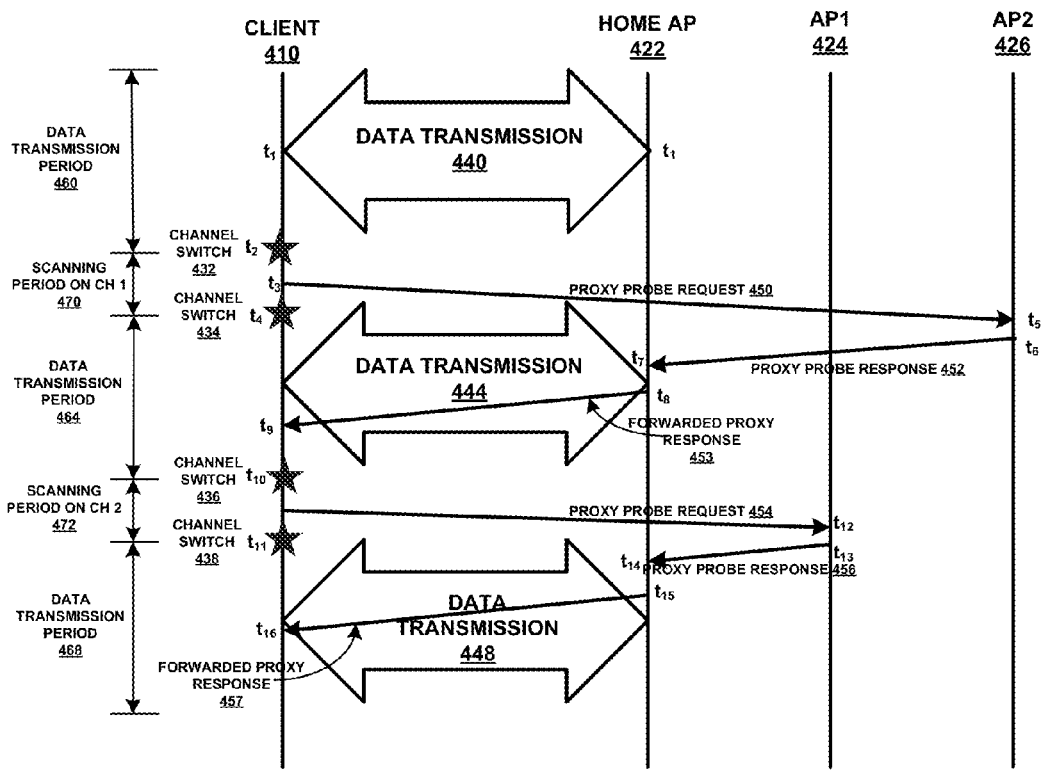
FIG. 4 illustrates exemplary wireless communications in discovery stage of fast roaming in a wireless network according to embodiments of the present disclosure.

FIG. 4 illustrates exemplary wireless communications in discovery stage of fast roaming in a wireless network. Specifically, FIG. 4 includes client 410 and multiple access points, including home AP 422, AP1 424, and AP2 426, etc. In this example, home AP 422 is currently connected to client device 410 via wireless connections. Furthermore, AP1 424 and AP2 426 are also in the neighborhood of client device 410, and thus potential APs that client device 410 may become associated with, e.g., after roaming to a new location.

In some embodiments, client device 410 initially communicates with home AP 422 on a wireless communication channel. At time point $t_1$, client device 410 is in data transmission period 460, during which data transmission 440 is performed between client device 410 and home AP 422.

As client devices 410 changes its physical location, it may need to discover another AP in the neighborhood that provides stronger coverage and/or better service than home AP 422. Thus, at time point $t_2$, client device 410 starts the channel scanning process, and performs channel switch 432 to switch to another wireless communication channel (e.g. channel 1) at time point $t_2$. After client device 410 switches to the other wireless communication channel, client device 410 sends a request message (e.g., a proxy probe request 450) on the other wireless communication channel at time point $t_3$, and immediately performs a channel switch 434 back to the initial wireless communication channel, which client device 410 uses to communicate with home AP 422, at time point $t_4$. Thereafter, client device 410 resumes data transmission 444 with home AP 422, e.g., at time point $t_8$ until client device 410 performs another channel switch 436 to scan the next wireless communication channel at time point $t_{10}$.

Accordingly, the time period between channel switch 432 at time point $t_2$ and channel switch 434 at time point $t_4$ indicates scanning period 470 on the other wireless communication channel, e.g., channel 1. Moreover, the time period between channel switch 434 at time point $t_4$ and channel switch 436 at time point $t_{10}$ indicates the increased data transmission time period 464 compared to other alternatives.

On the other hand, after an access point (e.g., AP2 426) receives a request message (e.g., proxy probe request 450) at time point $t_5$, the access point will send a response message, e.g., proxy probe response 452 at time point $t_6$. In some embodiments, the access point (e.g., AP2 426) can send the response message over a wired interface, e.g., over a distributed system. In other embodiments, the access point (e.g., AP2 426) can send the response message via wireless distribute system (e.g. mesh networks). In the illustrated example, assuming that AP2 426 sends the response message via wired interface to client device 410. The response message, e.g., proxy probe response 452, which has a destination address associated with client device 410, is first received by home AP 422. Because client device 410 is currently associated with home AP 422, all messages with a destination address associated with client device 410 will be transmitted to client device 410 via home AP 422. After home AP 422 receives the response message (e.g., proxy probe response 452) at time point $t_7$, home AP 422 will forward the response message (e.g., forwarded proxy response 453) to client device 410 at time point $t_8$. The forwarded response message reaches client device 410 at time point $t_9$ on the initial wireless communication channel.

Thereafter, at time point $t_{10}$, client device 410 performs channel switch 436 to switch to the next wireless communication channel, e.g., channel 2, and sends another request message, e.g., proxy probe request 454, which is received by AP1 424 at time point $t_{12}$. After sending the request message on the next wireless communication channel (e.g., channel 2), client device 410 performs channel switch 438 to switch back to its initial communication channel immediately at time point $t_{11}$.

Similar to the scanning of the previous channel, after an access point (e.g., AP1 424) receives a request message (e.g., proxy probe request 454) at time point $t_{12}$, the access point will send a response message, e.g., proxy probe response 456 at time point $t_{13}$. In some embodiments, the access point (e.g., AP1 424) can send the response message over a wired interface, e.g., over a distributed system. In other embodiments, the access point (e.g., AP1 424) can send the response message via wireless distribute system (e.g. mesh networks).

Assuming that AP1 426 sends the response message via wired interface to client device 410. The response message (e.g., proxy probe response 456), which has a destination address associated with client device 410, is first received by home AP 422. After home AP 422 receives the response message (e.g., proxy probe response 456) at time point $t_{14}$, home AP 422 will forward the response message (e.g., forwarded proxy response 457) to client device 410 at time point $t_{15}$. The forwarded response message reaches client device 410 at time point $t_{16}$ on the initial wireless communication channel.

Accordingly, the time period between channel switch 436 at time point $t_{10}$ and channel switch 438 at time point $t_{11}$ indicates scanning period 472 on the next wireless communication channel, e.g., channel 2. Moreover, the time period subsequent to channel switch 438 at time point $t_{11}$ corresponds to the increased data transmission time period 468 compared to other alternatives.

Note that, if client device 410 receives a response message (e.g., proxy probe response 453 or proxy probe response 457) through a wired interface, such as via a distribution system, client device 410 further calculates a signal strength level associated with the sender of the response message (e.g., a Received Signal Strength Indicator (RSSI) level associated with AP2 426 or AP1 424) through the following formula:

$$RSSI_{AP} = RSSI_{sta} + TxPower_{sta} - TxPower_{ap}$$

Here, $RSSI_{sta}$ indicates a signal strength level associated with the request message (e.g., proxy probe request 450 or 454) from client device 410 as received by a network device (e.g., AP 2 426 or AP1 424) in the wireless network. $TxPower_{sta}$ indicates the transmit power level of client device 410 that sends the request message, whereas $TxPower_{ap}$ indicates the transmit power level of the network device (e.g., AP2 426 or AP1 424) that sends the response message.

In some embodiments, client device 410 and network devices (e.g., AP1 424 or AP2 426) transmit at the same or similar power setting. Thus, the signal strength of a message from client device 410 as received by the network devices will be same or similar to the signal strength of a message from the network devices as received by client device 410.

In other embodiments, client device 410 and network devices (e.g., AP1 424 or AP2 426) transmit at the different power settings. Accordingly, the signal strength of a message from client device 410 as received by the network devices neither will be same nor similar to the signal strength of a message from the network devices as received by client device 410. Therefore, adjustment of signal strength level needs to be calculated in order to correctly estimate the signal strength that would be associated with a response message transmitted from an network device on the network device's working channel (e.g., from AP2 426 on channel 1), if the response message were to be sent to client device 410 directly from the network device (e.g., AP2 426) on the network device's working channel (e.g., channel 1). As shown above, the adjustment is calculated based on the difference between transmit power settings of client device 410 and the network device (e.g., AP2 426).

Note that the response message (e.g., proxy probe response 452) can be transmitted through two ways. In some embodiments, the response message can be transmitted via a distribute system, which may be a wired interface or a wireless interface to backhaul communication channels. If the response message is transmitted via the distribution system, the response message can be encapsulated as FIG. 5 format. In other embodiments, the response message is transmitted over the air on the client device's working channel. If the response message is transmitted on the client device's working channel, the response message may be in a probe response format in compliance with IEEE 802.11 standard.

Also, it is important to note that, because the network device (e.g., AP2 426) is allowed to send a response message (e.g., proxy probe response 452) through a wired ore wireless interface over a distribution system and/or on client device 410's working channel, it is not necessary for client device 410 to wait on each wireless communication channel for the response message during channel scanning in the discovery stage of fast roaming. Thus, client device 410 can switch back to the wireless communication channel it uses to communicate with home AP 410 immediately after sending a request message (e.g., a probe request) on the channel to be scanned, and resume data transmissions with the home AP 422. In some embodiments, the waiting period on each channel can be set to merely 1 to 2 milliseconds, and thus significantly improve data transmissions between client device 410 and home AP 422 during discovery stage of fast roaming.

Network Response Frame Format

Figure 5:
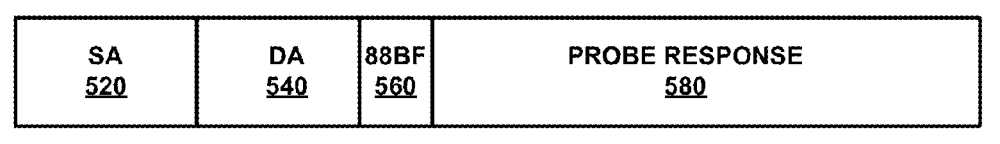

FIG. 5 illustrates an exemplary network frame used in discovery stage of fast roaming in a wireless network. FIG. 5 includes at least the following fields: source address (SA) 520, destination address (DA) 540, special information element (IE) field 560 indicating that the network frame may require special processing, and payload 580. In the given example, when used in a response message, the special value "88BF" is used to indicate that the network response frame requires special processing, for example, because it is sent over a distributed system rather than on the network device's working channel. In one embodiment, special IE field 560 may indicate a prototype field. If special processing is required, the response message may be encapsulated with an Ethernet header with prototype field value set to, for example, "88BF."

On the other hand, in a request message, the same special value "88BF" can be used in the header of the request message to indicate that the client device sending the request has the capability of performing the alternative channel scanning protocol. In addition, a client device supporting the alternative channel scanning protocol typically should either include this proto-type code information element in its association response message, probe request message, beacon frame, etc., or encapsulate the message with an Ethernet header with proto-type set to "88bf." Network devices supporting this alternative channel scanning protocol typically should include this information element in their probe response messages, association response messages, beacon frames, etc.

Furthermore, in some embodiment, network frames can optionally include a field indicating a peer node's signal strength level, e.g., a RSSI value. The signal strength level can be indicated in the header or the body of the network message. For example, an access point may include the RSSI of a request message received from the client device in a probe response message to the client device.

Moreover, network frames can also include a timestamp, which can be used to check the validity of the response messages. The scan timestamp element can be added to a probe request message if the client device sending the message supports the alternative channel scanning mechanism. Also, the scan timestamp element can be added to a probe response message if the access point sending the response supports the alternative channel scanning mechanism.

Specifically, a client device can add its local time to the probe request message during channel scanning. After a target access point (target AP) receives the probe request including the scan timestamp, the target AP may copy the timestamp to its probe response message, which is sent to the client device via a distributed system. When the client device receives the forwarded probe response message from its home AP, the client device first checks the timestamp against its current local time prior to processing the message. If the difference between the scan timestamp included in the response message and the current local time at the client device exceeds a predetermined threshold, the device will determine that the response message is not a valid response because it is out-of-date, and ignore the response message.

Client Device Location Tracking in Discovery Stage of Fast Roaming

In some embodiments, a network device (e.g., an access point) can discover its neighboring network devices in a wireless network, and broadcast its neighborhood information, such as the location, the channel, the transmit power, and/or the antenna gain of its neighboring network devices in beacon frames transmitted over the air. This allows a client device, which is in the discovery stage of fast roaming, to obtain a plurality of candidate network devices through analyzing the beacon frame. In some embodiments, the client device can further get its own physical location, e.g., through a global positioning system (GPS) module. By comparing the client device's physical location against the neighborhood information in the beacon frame sent by the network device, the client device and/or a network device can identify one or more suitable network devices in the neighborhood as potential target access points for fast roaming.

FIGS. 6A-6B illustrate exemplary device location tracking used in discovery stage of fast roaming. FIG. 6A includes at least a field for network device identifiers (e.g., AP 620) and a field for network device locations (e.g., AP location 640). In the illustrated example, assuming that AP1 622 is located at (40°7'00, 116°35'00), AP2 624 is located at (40°7'30, 116°35'20), AP3 626 is located at (40°7'30, 116°35'50), etc.

FIG. 6B includes at least a field for client device identifiers (e.g. client 660) and a field for client device locations (e.g., client location 680). In the illustrated example, assuming that client1 662 is located at (40°7'20, 116°36'30). Note that, the information in FIGS. 6A and 6B used for client location tracking can be maintained on a client device, a network device, or an external storage device that is accessible by the client device and/or the network device. The network devices' locations may be stored in the same or different storage structure as the client device(s)' location(s).

Based on the location tracking information in FIG. 6A and/or FIG. 6B, a client device and/or a network device may identify the closest network devices to the client's current location. In some embodiments, FIG. 6B may also include the client device's anticipated location after fast roaming starts. In that case, the client device and/or the network device can proactively determines which access points will be located in the neighborhood where the client device is about to move into.

In some embodiments, the client device and/or network device may use the following formulas to identify the neighboring access points. First, the client device and/or the network device calculate a distance between the client device and an access point based on their physical locations. For example, when GPS coordinates are available for the client device and the access points, the distance between the two devices can be determined by:

$$D=\text{func}(\text{lattitude}_{sta}, \text{longitude}_{sta}, \text{lattitude}_{ap}, \text{longitude}_{ap}) \quad (1)$$

Because the distance between the access point and the client device is far shorter than the radius of earth, the above formula can be simplified as:

$$D=\sqrt{D_{\text{latitude}}^2 + D_{\text{longitude}}^2} \quad (2)$$

$$D_{longitude}=R \times \cos(\text{latitude}_{ap}) \times |\text{longitude}_{ap} - \text{longitude}_{sta}| \quad (3)$$

$$D_{latitude}=R \times |\text{latitude}_{ap} - \text{latitude}_{sta}| \quad (4)$$

where R indicates the radius of the earth.

The following formula can be used to calculate the free space loss between the client device and the access point:

$$\text{Loss}=32.44+20 lgF \text{ (Mhz)}+20 lgD \text{ (Km)} \quad (5)$$

The received signal strength of the access point can be calculated by:

$$\text{RSSI}=tx\_power+tx\_ant\_gain-\text{Loss}+rx\_ant\_gain-\text{noise\_floor} \quad (6)$$

In some embodiments, a client device may determine that it is time to initiate roaming if the signal strength levels (e.g., one or more RSSI values) of messages, which are received from the access point that the client device is currently associated with, are lower than a predetermined threshold or lower than a signal strength level associated with a different message received from another access point in the network. In one embodiment, the client device may select an access point, the message transmitted from which are associated with the highest signal strength levels, to be the target AP. In some embodiments, the fluctuation in signal strength levels may be caused by temporary or permanent physical obstruction. Also, there may be various degrees of difference between the calculated signal strength value and the actual signal strength value. Therefore, the client device may need to perform another round of check and calculation of the signal strength level during the next scanning period and/or iteration.

In some embodiments, if a client device and/or network device identify one or more neighboring network devices as target APs, the client device will selectively scan through the channels that those target APs use to communication, rather than iteratively scan through each and every wireless communication channel during the discovery stage of fast roaming.

Processes for Improving Performance in Discovery Stage of Fast Roaming

Figure 7A:
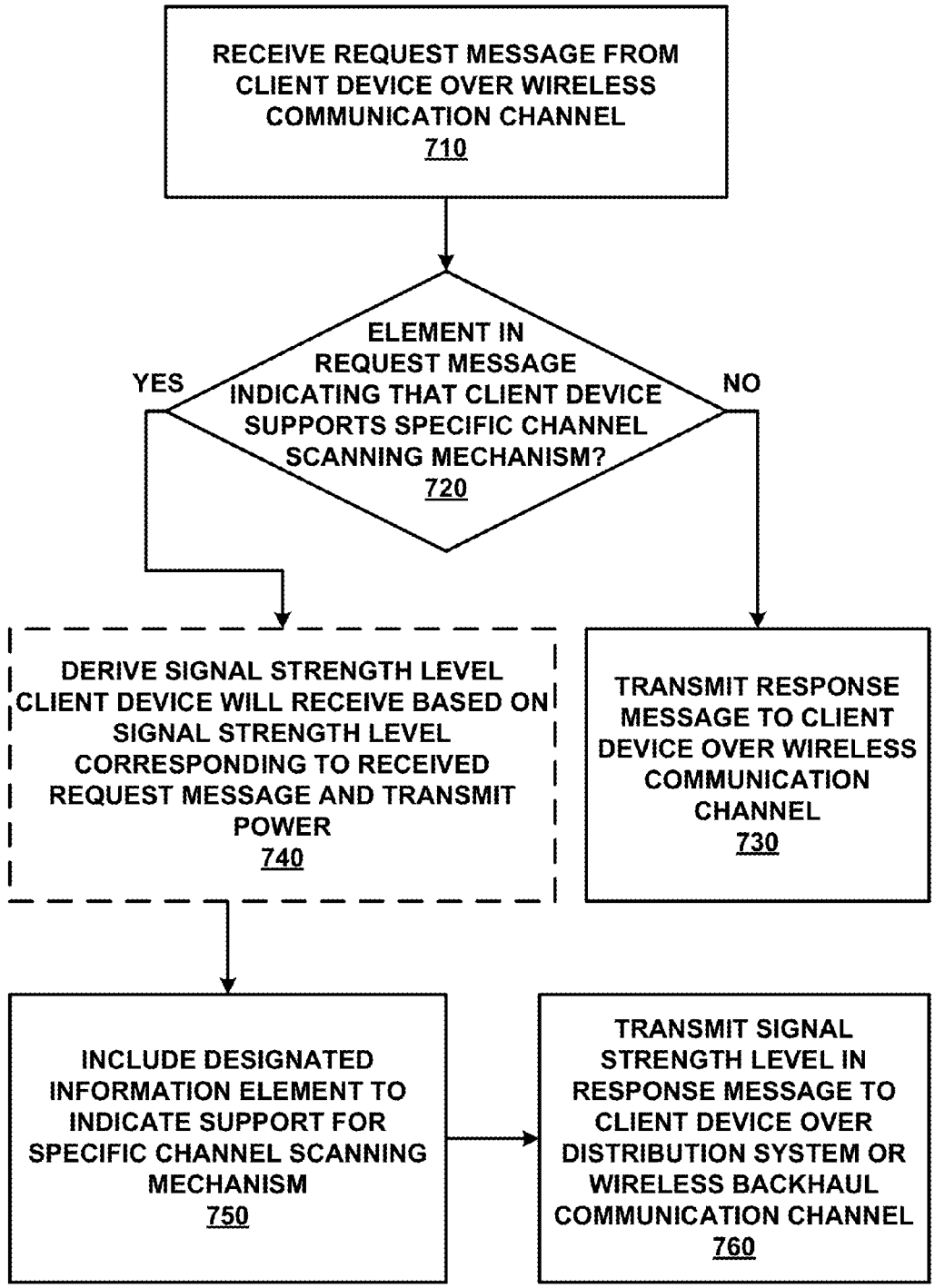
FIGS. 7A-7B are flowcharts illustrating exemplary process of channel scanning in discovery stage of fast roaming in a wireless network according to embodiments of the present disclosure.

FIG. 7A is a flowchart illustrating exemplary process of channel scanning at a network device supporting the specific channel scanning mechanism in discovery stage of fast roaming in a wireless network. During operations, a network device receives a request message from a client device over a wireless communication channel (operation 710). In some embodiments, the wireless communication channel is the current working channel of the network device. The request message may include, for example, an association request, a probe request, etc.

Next, the network device determines whether the request message includes an information element (IE) indicating that the client device supports a specific channel scanning mechanism (operation 720). In some embodiments, the specific channel scanning mechanism allows the client device to switch back immediately to its working data transmission channel after sending the request message on the channel to be scanned.

If the request message does not include the specific IE, the network device will transmit a response message to the client device on a wireless communication channel, which is usually the network device's working communication channel (operation 730).

If, on the other hand, the request message includes the specific IE indicating support for the channel scanning mechanism, the network device may optionally perform calculations described in previous sections to derive a signal strength level associated with a response message that the client would have received if the response message were to be sent on the network device's working communication channel (operation 740). In some embodiments, the calculation may be performed by the client device. In those scenarios, the network device will include the signal strength of the request message received from the client device, for example, in the content of the payload in its corresponding response message.

In addition, the network device will include a designated information element to indicate that the network device supports the specific channel scanning mechanism (operation 750). If a client device receives a response message with the designated information element, the client device will derive the signal strength level based on content in the payload of the response message rather than using the detected signal strength associated with the received response message.

Thereafter, the network device will transmit the signal strength level in the response message to the client device via a wired or wireless interface to a distribution system, or through the client device's current data transmission channel (operation 760).

Figure 7B:
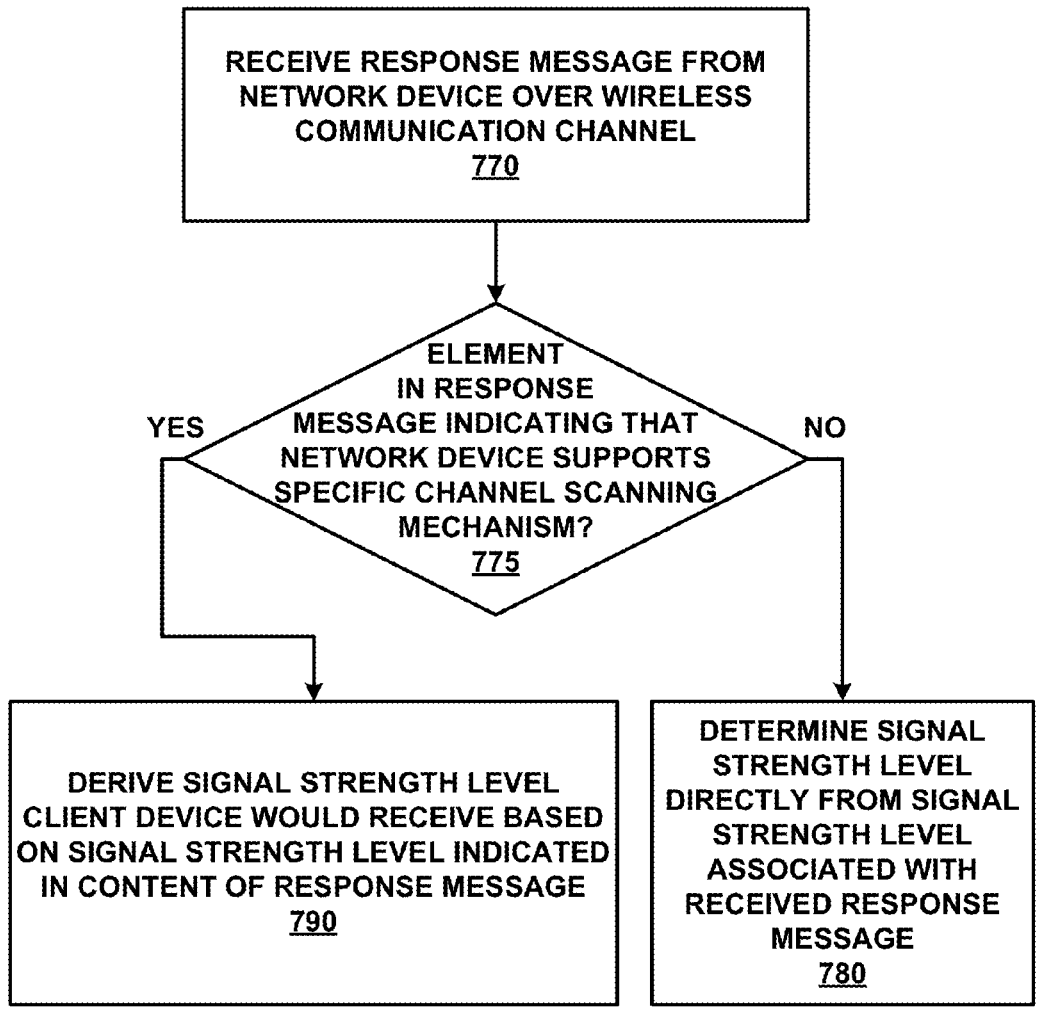

FIG. 7B is a flowchart illustrating exemplary process of channel scanning at a client device supporting the specific channel scanning mechanism in discovery stage of fast roaming in a wireless network. During operations, a client device receives a response message from a network device over a wireless communication channel (operation 770). In some embodiments, the client is currently associated with the network device on the wireless communication channel, and uses the wireless communication channel for data transmissions.

Next, the client device determines whether the network device sending the response message supports a specific channel scanning mechanism based on whether the response message includes an information element (IE) (operation 775). Specifically, the indicated channel scanning mechanism can allow the client device to switch back immediately to its working data transmission channel after sending the request message on the channel to be scanned, and improve data transmission performance during discovery stage of fast roaming.

If the response message does not include the specific IE, the client device will determine a signal strength level directly from the signal strength level associated with the received response message (operation 780). If, on the other hand, the response message includes the specific IE, and if the signal strength is not already derived by the network device, the client device may optionally perform calculations described in previous sections to derive a signal strength level associated with a received response message that the client would have received if the response message were to be sent on the network device's working wireless communication channel rather than the distribution system (operation 790). Note that, in many cases, the derived signal strength level may be different from the signal strength level associated with the received response message.

Systems for Improving Performance in Discovery Stage of Fast Roaming

Figure 8:
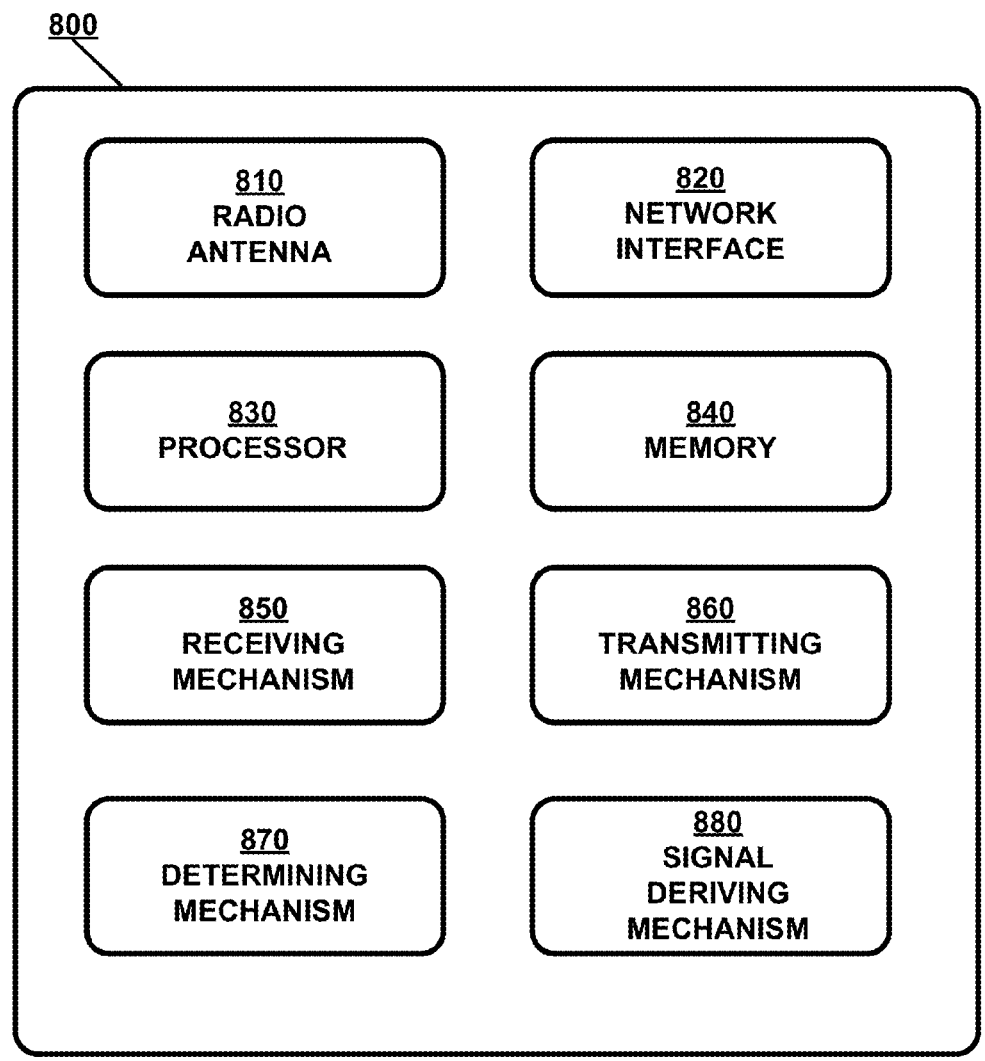
FIG. 8 is a block diagram illustrating exemplary system for channel scanning in discovery stage of fast roaming in a wireless network according to embodiments of the present disclosure.

FIG. 8 is a block diagram illustrating a network device system for improving performance in discovery stage of fast roaming in wireless networks according to embodiments of the present disclosure.

Network device 800 includes at least one or more radio antennas 810 capable of either transmitting or receiving radio signals or both, a network interface 820 capable of communicating to a wired or wireless network, a processor 830 capable of processing computing instructions, and a memory 840 capable of storing instructions and data. Moreover, network device 800 further includes a receiving mechanism 850, a transmitting mechanism 860, a determining mechanism 870, and a signal deriving mechanism 880, all of which are coupled to processor 830 and memory 840 in network device 800. Network device 800 may be used as a client system, or a server system, or may serve both as a client and a server in a distributed or a cloud computing environment.

Radio antenna 810 may be any combination of known or conventional electrical components for receipt of signaling, including but not limited to, transistors, capacitors, resistors, multiplexers, wiring, registers, diodes or any other electrical components known or later become known.

Network interface 820 can be any communication interface, which includes but is not limited to, a modem, token ring interface, Ethernet interface, wireless IEEE 802.11 interface (e.g., IEEE 802.11n, IEEE 802.11ac, etc), cellular wireless interface, satellite transmission interface, or any other interface for coupling network devices.

Processor 830 can include one or more microprocessors and/or network processors. Memory 840 can include storage components, such as, Dynamic Random Access Memory (DRAM), Static Random Access Memory (SRAM), etc.

Receiving mechanism 850 generally receives one or more network messages via network interface 820 from a distribution system or radio antenna 810 from a wireless client over a wireless communication channel. The received network messages may include, but are not limited to, requests and/or responses, beacon frames, management frames, control path frames, and so on. Each message may comprise one or more data packets, for example, in the form of IP packets.

In some embodiments, receiving mechanism 850 receives a request message (e.g., an association request, or a probe request) from a client device on a wireless communication channel. The wireless communication channel corresponds to the working channel of the network device. In some embodiments, the request message is associated with a first signal strength level. In some embodiments, the request message includes a designated field indicating that the client device sending the request message supports a specific channel scanning mechanism.

Transmitting mechanism 860 generally transmits messages, which include, but are not limited to, requests and/or responses, beacon frames, management frames, control path frames, and so on. In some embodiments, transmitting mechanism 860 transmits a response message via a different communication interface if the request message received by receiving mechanism 850 includes the designated field. The response message may include a signal strength level, which can be the same as the signal strength level corresponding to the received request message in some embodiments, or a derived signal strength level.

Note that, transmitting mechanism 860 may transmit messages through one or more of the following interfaces: a wired interface to a distribution system, a first wireless interface to a distribution system, and/or a wireless interface associated with a data transmission wireless communication channel of the client device.

Determining mechanism 870 generally determines whether a request message or a response message includes a designated field. The designated field indicates capability to support a specific channel scanning mechanism during a discovery stage of fast roaming in a wireless network. If the message includes the designated field, transmitting mechanism 860 will transmit the response message via a different communication interface from the working or data transmission wireless communication channel of network device 800. Otherwise, transmitting mechanism 860 will transmit the response message via its current working wireless communication channel.

Signal deriving mechanism 880 generally derives a signal strength level associated with a response message based on the signal strength level associated with the received request message, the transmit power associated with the client device sending the request message, and the transmit power associated with the network device sending the response message. The signal deriving mechanism 880 may include the derived signal in the content of payload in a response message that is to be transmitted to the client device, if the request message includes the designated field.

Therefore, receiving mechanism 850, transmitting mechanism 860, determining mechanism 870, and signal deriving mechanism 880 often collectively operate with each other to improve performance of client devices during discovery stage of their fast roaming in wireless networks.

Figure 9:
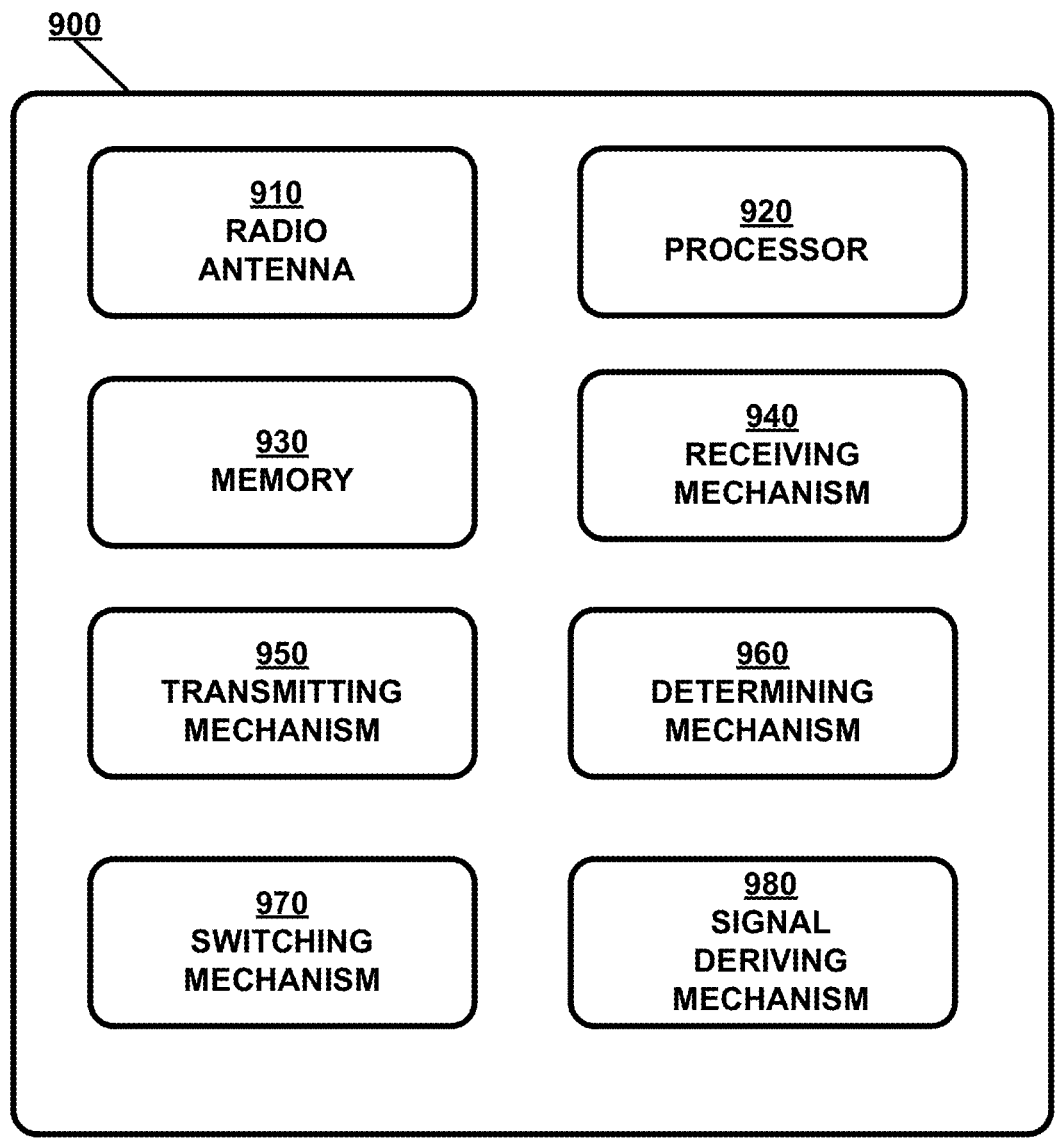
FIG. 9 is a block diagram illustrating exemplary system for channel scanning in discovery stage of fast roaming in a wireless network according to embodiments of the present disclosure.

FIG. 9 is a block diagram illustrating a digital device system for improving performance in discovery stage of fast roaming in wireless networks according to embodiments of the present disclosure.

Digital device 900 includes at least one or more radio antennas 810 capable of either transmitting or receiving radio signals or both, a processor 920 capable of processing computing instructions, and a memory 930 capable of storing instructions and data.

Moreover, digital device 900 further includes a receiving mechanism 940, a transmitting mechanism 950, a determining mechanism 960, a switching mechanism 970, and a signal deriving mechanism 980, all of which are coupled to processor 920 and memory 930 in digital device 900. Digital device 900 may be used as a client system, or a server system, or may serve both as a client and a server in a distributed or a cloud computing environment.

Radio antenna 910 may be any combination of known or conventional electrical components for receipt of signaling, including but not limited to, transistors, capacitors, resistors, multiplexers, wiring, registers, diodes or any other electrical components known or later become known. Radio antenna 910 can be compliant with a number of interfaces, including but not limited to, wireless IEEE 802.11 interface (e.g., IEEE 802.11n, IEEE 802.11ac, etc), cellular wireless interface, satellite transmission interface, or any other interface for coupling devices in wireless networks.

Processor 920 can include one or more microprocessors and/or network processors. Memory 930 can include storage components, such as, Dynamic Random Access Memory (DRAM), Static Random Access Memory (SRAM), etc.

Receiving mechanism 940 generally receives one or more network messages radio antenna 910 from a network device serving as a home access point over a wireless communication channel. The received network messages may include, but are not limited to, requests and/or responses, beacon frames, management frames, control path frames, and so on. Each message may comprise one or more data packets, for example, in the form of IP packets.

In some embodiments, receiving mechanism 940 receives a response message (e.g., an association response, or a probe response) from a network device (e.g., an access point) via a different communication interface from the working wireless communication channel of the network device. The different communication interface comprises one or more of a wired interface to a distribution system, a first wireless interface to a distribution system, and/or a second wireless interface associated with a data transmission wireless communication channel of the digital device.

Transmitting mechanism 950 generally transmits messages, which include, but are not limited to, requests and/or responses, beacon frames, management frames, control path frames, and so on. In some embodiments, transmitting mechanism 950 transmits a request message on the working (or data transmission channel) wireless communication channel of digital device 900. The request message may include a designated field, which indicates that digital device 900 supports a specific channel scanning mechanism.

Determining mechanism 960 generally determines whether a request message or a response message includes the designated field. Inclusion of the designated field generally indicates capability to support a specific channel scanning mechanism by a digital device (including network devices or client devices) during a discovery stage of fast roaming in a wireless network.

If the message does not include the designated field, determining mechanism 960 will determine the signal strength level directly based on the signal strength of the response message received from the networking device serving as the home access point.

If the message includes the designated field, signal deriving mechanism 980 will derive a signal strength level associated with a response message based on the content of the response message. In some embodiment, signal deriving mechanism 980 may retrieve a derived signal in the content of payload in a response message if it has been derived by the network device sending the response message to the client device. Alternatively, signal deriving mechanism 980 may retrieve a first signal strength level from the content of the response message, and derive a second signal strength level based on the first signal strength level which is associated with a previously request message from the digital device, the transmit power associated with the digital device, and the transmit power associated with the network device sending the response message.

Further, switching mechanism 970 generally can switch digital device 900 from communicating on one wireless communication channel to communicating on another wireless communication channel. For example, switching mechanism 970 can switch digital device 900 from its working channel used for data transmission with its current home access point to a scanning channel. Also, switching mechanism 970 can switch from one scanning channel to a different scanning channel. In addition, when digital device 900 supports a specific channel scanning mechanism, switching mechanism 970 can switch back from the scanning channel to its working channel used for data transmission with the home AP immediately after transmitting a request message on the scanning channel.

Therefore, receiving mechanism 940, transmitting mechanism 950, determining mechanism 960, switching mechanism 970, and signal deriving mechanism 980 often collectively operate with each other to improve performance by digital device 900 during discovery stage of its fast roaming in wireless networks.

According to embodiments of the present disclosure, network services provided by wireless network device 800, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
   receiving, from a client device by a first network device, a wireless signal corresponding to a request message on a first wireless communication channel, wherein the request message includes a first signal strength level;
   deriving, by the first network device, a second signal strength level based at least on the first signal strength level, a transmit power level associated with the client device, and a transmit power level associated with the first network device; and
   transmitting, by the first network device, a response message corresponding to the request message and addressed to the client device via a second network device on a second wireless communication channel or a wired communication channel, the response message comprising the second signal strength level.

2. The method of claim 1, wherein the response message further comprises the first signal strength level.

3. The method of claim 1, wherein the response message is received via one or more of:
   a wired interface to a distribution system;
   a first wireless interface to a distribution system; and
   a second wireless interface associated with a data transmission channel of the client device.

4. The method of claim 1, wherein the response message includes a designated field indicating that the first network device supports a particular channel scanning protocol.

5. A method comprising:
   transmitting, by a digital device, a request message on a first communication channel, the request message being received by at least a first network device;
   switching, by the digital device, from the first communication channel to a second communication channel prior to receiving a response message corresponding to the request message;
   receiving, from a second network device by the digital device, the response message corresponding to the request message via one of the second communication channel and a third communication channel; and
   in response to the response message indicating support for a particular channel scanning protocol:
      retrieving, by the digital device, a first signal strength level from content of the response message; and
      deriving, by the digital device, a second signal strength level based at least on the first signal strength level, a transmit power level associated with the digital device, and a transmit power level associated with the second network device transmitting the response message.

6. The method of claim 5, further comprising:
   in response to the response message not indicating support for the particular channel scanning protocol, determining, by the digital device, a third signal strength level from a fourth signal strength level associated with the received response message.

7. The method of claim 5, wherein the first communication channel is a first wireless communication channel, the second communication channel is a second wireless communication channel used by the digital device for data frame transmissions.

8. The method of claim 5, wherein the response message is received via one or more of:
   a wired interface to a distribution system;
   a first wireless interface to a distribution system; and
   a second wireless interface associated with a data transmission channel of the digital device.

9. The method of claim 5, wherein the request message includes a designated field indicating that the digital device supports a channel scanning protocol.

10. The method of claim 5, further comprising:
    identifying the first communication channel based on a location of the digital device.

11. A network device comprising:
    a processor;
    a memory;
    a receiving mechanism operating with the processor, the receiving mechanism receives a wireless signal corresponding to a request message from a client device on a first wireless communication channel, wherein the request message includes a first signal strength level;
    a signal deriving mechanism operating with the processor, the signal deriving mechanism derives a second signal strength level based at least on the first signal strength level, a transmit power level associated with the client device, and a transmit power level associated with the first network device; and
    a transmitting mechanism operating with the processor, the transmitting mechanism transmits a response message corresponding to the request message and addressed to the client device via a second network device on a second wireless communication channel or a wired communication channel, the response message comprising the second signal strength level.

12. The network device of claim 11, wherein the response message further comprises the first signal strength level.

13. The network device of claim 11, wherein the response message is received via one or more of:
    a wired interface to a distribution system;
    a first wireless interface to a distribution system; and
    a second wireless interface associated with a working wireless communication channel of the client device.

14. The network device of claim 11, wherein the response message includes a designated field indicating that the network device supports a channel scanning protocol.

15. A digital device comprising:
    a processor;
    a memory;
    a transmitting mechanism operating with the processor, the transmitting mechanism to transmit a request message on a first wireless communication channel, the request message being received by at least a first network device;
    a switching mechanism operating with the processor, the switching mechanism to switch from the first wireless communication channel to a second wireless communication channel prior to receiving a response message corresponding to the request message;
    a receiving mechanism operating with the processor, the receiving mechanism to receive from a second network device the response message corresponding to the request message via the second wireless communication channel or a wired communication channel;
    a signal deriving mechanism operating with the processor, the signal deriving mechanism to retrieve a first signal strength level from content of the response message, wherein the signal deriving mechanism further to derive a second signal strength level based at least on the first signal strength level, a transmit power level associated with the digital device, and a s transmit power level associated with the second network device transmitting the response message in response to the response message indicating support for a particular channel scanning protocol.

16. The digital device of claim 15, wherein the signal deriving mechanism determines a third signal strength level from a fourth signal strength level associated with the response message in response to the response message not indicating support for the particular channel scanning protocol.

17. The digital device of claim 15, wherein the second wireless communication channel is used by the digital device for data frame transmissions.

18. The digital device of claim 15, wherein the response message is received via one or more of:
  a wired interface to a distribution system;
  a first wireless interface to a distribution system; and
  a second wireless interface associated with a data transmission channel of the digital device.

19. The digital device of claim 15, wherein the response message includes a designated field indicating that the digital device supports a channel scanning protocol.

20. The digital device of claim 15, wherein the switching mechanism further identifies the first communication channel based on a location of the digital device.

21. A non-transitory computer-readable storage medium storing embedded instructions that are executed by one or more mechanisms implemented within a network device to perform a plurality of operations comprising:
  receiving, from a client device, a wireless signal corresponding to a request message on a first wireless communication channel, wherein the request message includes a first signal strength level;
  deriving a second signal strength level based at least on the first signal strength level, a transmit power level associated with the client device, and a transmit power level associated with the first network device; and
  transmitting a response message corresponding to the request message and addressed to the client device via a second network device on a second wireless communication channel or a wired communication channel, the response message comprising the second signal strength level.

22. The non-transitory computer-readable storage medium of claim 21, wherein the response message further comprises the first signal strength level.

23. The non-transitory computer-readable storage medium of claim 21, wherein the response message is received via one or more of:
  a wired interface to a distribution system;
  a first wireless interface to a distribution system; and
  a second wireless interface associated with a data transmission channel of the client device.

24. The non-transitory computer-readable storage medium of claim 21, wherein the response message includes a designated field indicating that the first network device supports a particular channel scanning protocol.

25. A non-transitory computer-readable storage medium storing embedded instructions that are executed by one or more mechanisms implemented within a digital device to perform a plurality of operations comprising:
  transmitting a request message on a first communication channel, the request message being received by at least a first network device;
  switching from the first communication channel to a second communication channel prior to receiving a response message corresponding to the request message;
  receiving, from a second network device, the response message corresponding to the request message via one of the second communication channel and a third communication channel; and
  in response to the response message indicating support for a particular channel scanning protocol:
    retrieving a first signal strength level from content of the response message; and
    deriving a second signal strength level based at least on the first signal strength level, a transmit power level associated with the digital device, and a transmit power level associated with the second network device transmitting the response message.

26. The non-transitory computer-readable storage medium of claim 25, further comprising:
  in response to the response message not indicating support for the particular channel scanning protocol, determining, by the digital device, a third signal strength level from a fourth signal strength level associated with the received response message.

27. The non-transitory computer-readable storage medium of claim 25, wherein the first communication channel is a first wireless communication channel, the second communication channel is a second wireless communication channel used by the digital device for data frame transmissions.

28. The non-transitory computer-readable storage medium of claim 25, wherein the response message is received via one or more of:
  a wired interface to a distribution system;
  a first wireless interface to a distribution system; and
  a second wireless interface associated with a data transmission channel of the digital device.

29. The non-transitory computer-readable storage medium of claim 25, wherein the request message includes a designated field indicating that the digital device supports a channel scanning protocol.

30. The non-transitory computer-readable storage medium of claim 25, further comprising:
  identifying the first communication channel based on a location of the digital device.

* * * * *